United States Patent

Hall et al.

Patent Number: 5,510,208
Date of Patent: Apr. 23, 1996

[54] COMPOSITE BATTERY CELL SLEEVE

[75] Inventors: John C. Hall, Saratoga; Juan F. Leon, San Diego, both of Calif.

[73] Assignee: Space Systems/Loral, Inc., Palo Alto, Calif.

[21] Appl. No.: 314,079

[22] Filed: Sep. 28, 1994

[51] Int. Cl.⁶ .................................................. H01M 2/02
[52] U.S. Cl. ..................... 429/164; 429/163; 429/168; 429/159; 429/120; 429/99
[58] Field of Search .................................. 429/168, 164, 429/163, 120, 159, 99

[56] References Cited

U.S. PATENT DOCUMENTS

| | | | |
|---|---|---|---|
| 4,346,151 | 8/1982 | Uba et al. | 429/54 |
| 5,096,788 | 3/1992 | Bresin et al. | 429/99 |

*Primary Examiner*—Stephen Kalafut
*Assistant Examiner*—Richard H. Lilley, Jr.
*Attorney, Agent, or Firm*—Perman & Green

[57] ABSTRACT

A battery cell sleeve assembly comprises first and second cylindrical sleeves contiguously joined and defining an internal recess for receiving a battery cell. The first sleeve is comprised of a plurality of substantially unidirectional longitudinally extending first elongated fibers of high conductivity, low density, material embedded in an epoxy matrix. The second sleeve is comprised of a plurality of second and third elongated fibers of high conductivity, low density, material also embedded in an epoxy matrix, the second and third fibers being substantially unidirectional extending transverse of the first fibers, the second and third fibers extending in mutually transverse directions. A cylindrical base member has an annular flange for reception thereon of proximal ends of the sleeves, distal ends of the first fibers being contiguous with the annular flange whereby the annular flange operates as a heat shunt for drawing heat away from the sleeve assembly by conduction between the first fibers and the annular flange. Preferably, the fibers are graphite and have a thermal conductivity no less than that of aluminum. Each of the sleeves is approximately 0.005 inches thick and composed of approximately 60% fiber and 40% epoxy by volume. Both of the sleeves have a longitudinally extending slot defined by opposed edges and including clamping devices for drawing the opposed edges together and thereby firmly securing the battery in the recess.

10 Claims, 3 Drawing Sheets

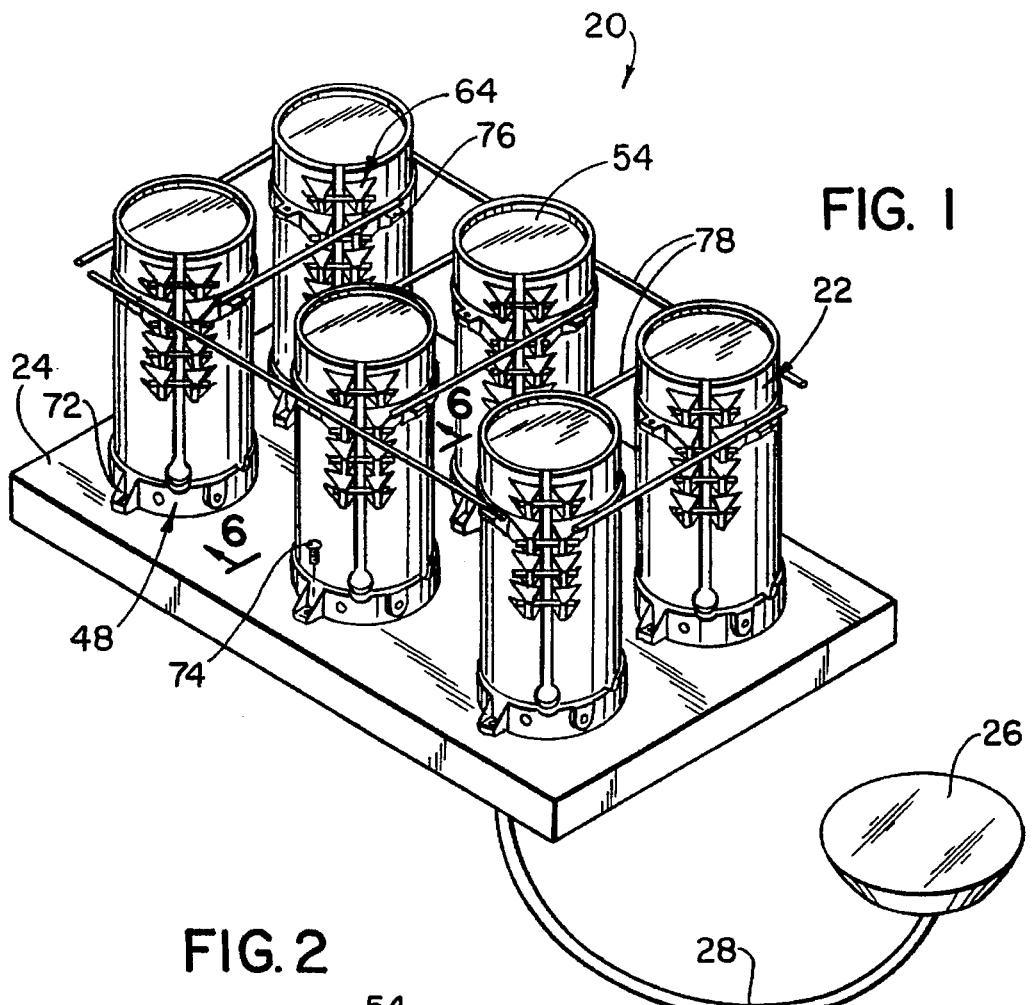
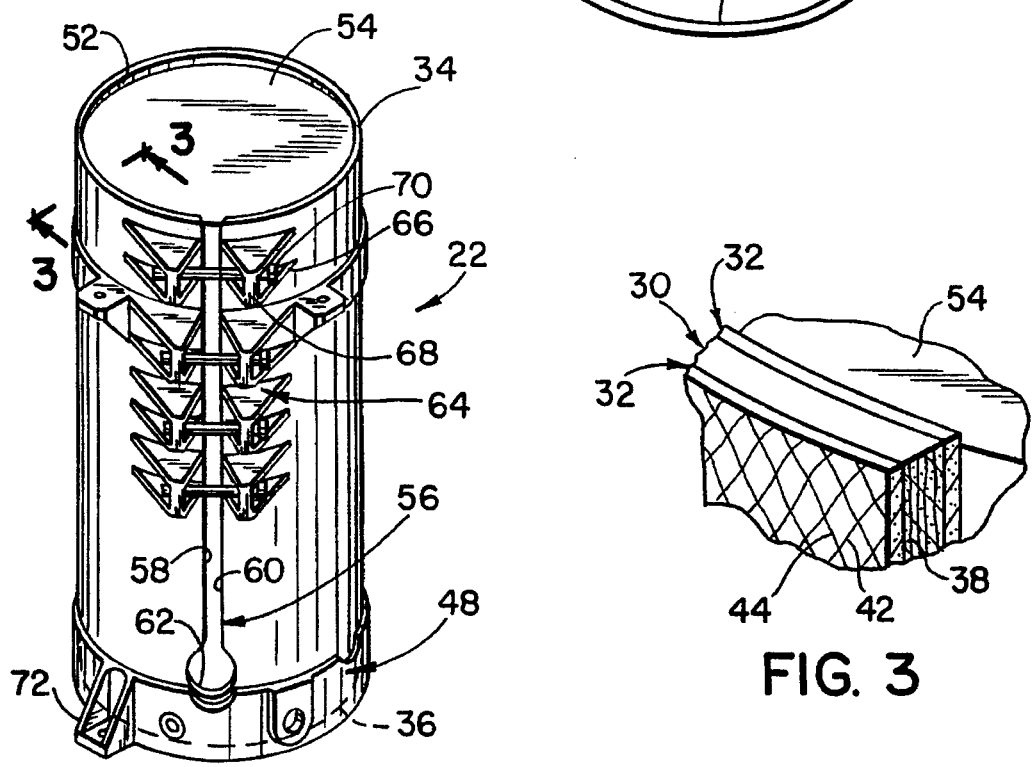

COMPOSITE BATTERY CELL SLEEVE

BACKGROUND OF THE INVENTION

1. Field of the Invention:

The present invention relates generally to improved systems for mounting batteries on spacecraft to assure their integrity, operability, and long life. Throughout this disclosure, the term "spacecraft" will be used in the generic sense to refer to spacecraft of all types whether they be launch vehicles, space stations, satellites, space probes, or other vehicles operable in a space environment.

2. Description of the Prior Art:

Nickel hydrogen batteries for spacecraft are typically mounted into the structure of the spacecraft by means of a plurality of cylindrical metallic sleeves which supportively receive individual cells. The functions of the sleeves are to (a) physically connect each cell to the battery structure and (b) conduct waste heat due to the operation of the cell to the base plate of the battery and thence to the spacecraft heat rejection system (e.g., an optical space radiator).

Numerous metals have been proposed for the fabrication of the battery cell sleeves. These have included aluminum, beryllium, magnesium and alloys of these metals. In actual fact, aluminum is the metal most commonly employed for this purpose. All of these materials meet the technical requirements of having high thermal conductivity, adequate ultimate strength, generally good fracture resistance, and low density. As is common in all space-related activities, weight is a serious consideration in the design and construction of battery cell sleeves such that materials other than metals are continuously being sought which possess all the characteristics noted above while being significantly lighter in weight.

In recent years, composite materials have more and more become materials of choice to replace metals in applications requiring strength and light weight. Composite materials, or "composites", incorporate clusters of elongated fibers of strong materials embedded in a slurry-like amorphous matrix which subsequently solidifies and binds the fibers together into a strong unit.

Graphite is a material which has outstanding thermal conductivity, especially in the pyrrolic form, and low density (~2 g/cm2). Pure graphite, however, is extremely brittle and for this reason, its use as a sleeve material has not previously been seriously considered. An additional non-technical but significant economic impediment to the use of graphite is that it can only be fabricated into formed parts from solid monoblocks by expensive machining.

SUMMARY OF THE INVENTION

It was in light of the state of the technology as just discussed that the present invention was conceived and has now been reduced to practice. According to the invention, a battery cell sleeve assembly comprises at least three cylindrical layers contiguously joined and defining an internal recess for receiving a battery cell. The first layer is comprised of a plurality of substantially unidirectional longitudinally extending first elongated fibers of high conductivity, low density, material embedded in an epoxy matrix. The two outside layers sandwiching the first layer between them are comprised of a plurality of second and third elongated fibers of high strength, low density, material also embedded in an epoxy matrix, the second and third fibers extending in mutually transverse directions. A cylindrical base member has an annular flange for reception thereon of distal ends of the sleeves, distal ends of the first fibers being contiguous with the annular flange whereby the annular flange operates as a heat shunt for drawing heat away from the sleeve assembly by conduction between the first fibers and the annular flange. Preferably, the fibers are graphite and have a thermal conductivity no less than that of aluminum. Each of the layers is approximately 0.005 inches thick and composed of approximately 60% fiber and 40% epoxy by volume. The sleeve assembly has a longitudinally extending slot defined by opposed edges and including clamping devices for drawing the opposed edges together and thereby firmly securing the battery in the recess.

Thus, the present invention discloses how to implement high thermal conductivity, low density graphite fibers as a material for the construction cell sleeves. Graphite fibers have favorable thermal conductivities up to 1100 W/m°K. as compared with pyrrolitic graphite (k<2000 W/m°K.) and pure aluminum (k=230 W/m°K.). In addition, and of even greater importance, unidirectional fiber arrays can be laminated with epoxy binders into thin conformal sheets. Such sheets can, for example, be easily formed into a cylinder suitable for use as a cell sleeve.

Such unidirectional graphite fiber arrays so laminated with an epoxy binder meet the thermal requirements of a cell sleeve assembly for a spacecraft in that they will operate to conduct heat from the electrochemical cell to the spacecraft radiator. The design, however, is incomplete in that (a) the unidirectional cylinder lacks the physical strength to support the heavy electrochemical cell during spacecraft launch and (b) it lacks a means of interfacing the cell sleeve mechanically and thermally with other cells in the battery and with the spacecraft.

The present invention addresses the first issue through the use of a heterogeneous laminate of thermally conductive unidirectional fibers preferably oriented in the axial direction of the battery cell and a structural square weave fiber epoxy composite. The structural layer or layers act to provide the required mechanical properties to the sleeve cylinder while the unidirectional thermal layers provide the required conductive properties. On a bulk basis, the resultant heterogeneous structure meets the same requirements of an isotropic metallic sleeve.

In practice, structures of the invention have been fabricated with AMOCO brand K1100/epoxy thermal layers with the graphite fibers oriented either at 0° or at ±15° with respect to the longitudinal axis of the cell. Such layers are typically 0.005" thick and composed of 60% fiber and 40% epoxy by volume. The required thermal conductivity is obtained by using sufficient layers factored for their off axis angle.

The above thermal structure is in turn contained inside a sandwich of structural fiber/epoxy layers. For example, 0.005" AMOCO brand T300 graphite fiber woven cloth impregnated with epoxy forms a high strength layer which is laminated to the inner and outer surfaces of the hollow cylinder. While double lamination is not strictly required it is been found desirable to yield a stable circular cylinder.

The second issue has been addressed by suitably bonding machined aluminum parts to the heterogeneous graphite epoxy structure described above as required to complete the thermal and mechanical interfaces to the spacecraft. Thus, at the base of the graphite/epoxy cylinder is an overlap bond with a concentric aluminum cylinder which serves as the mechanical and thermal interface to the battery base plate. The overlap is along an axial length of approximately 1 "

with a bond thickness of between 0.001" and 0.005". This design assures a sound mechanical interface and a low heat flux across the low thermal conductivity bond joint.

Similarly, aluminum mechanical features are bonded along the longitudinally extending slot provided for clamping the sleeve about the battery cell and for mechanically joining the cell to adjacent cells for improved mechanical competence.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

BRIEF DESCRIPTION OF THE DRAWINGS

FIG. 1 is a perspective view diagrammatically illustrating for a spacecraft a battery system embodying the present invention;

FIG. 2 is a perspective view of a battery cell sleeve assembly embodying the present invention and utilized in the battery system illustrated in FIG. 1;

FIG. 3 is an enlarged detail perspective view in section, taken generally along line 3—3 in FIG. 2, depicting, in greater detail, a part of the battery cell sleeve assembly illustrated in FIG. 2;

DETAILED DESCRIPTION OF THE PREFERRED EMBODIMENT

Figure 4:
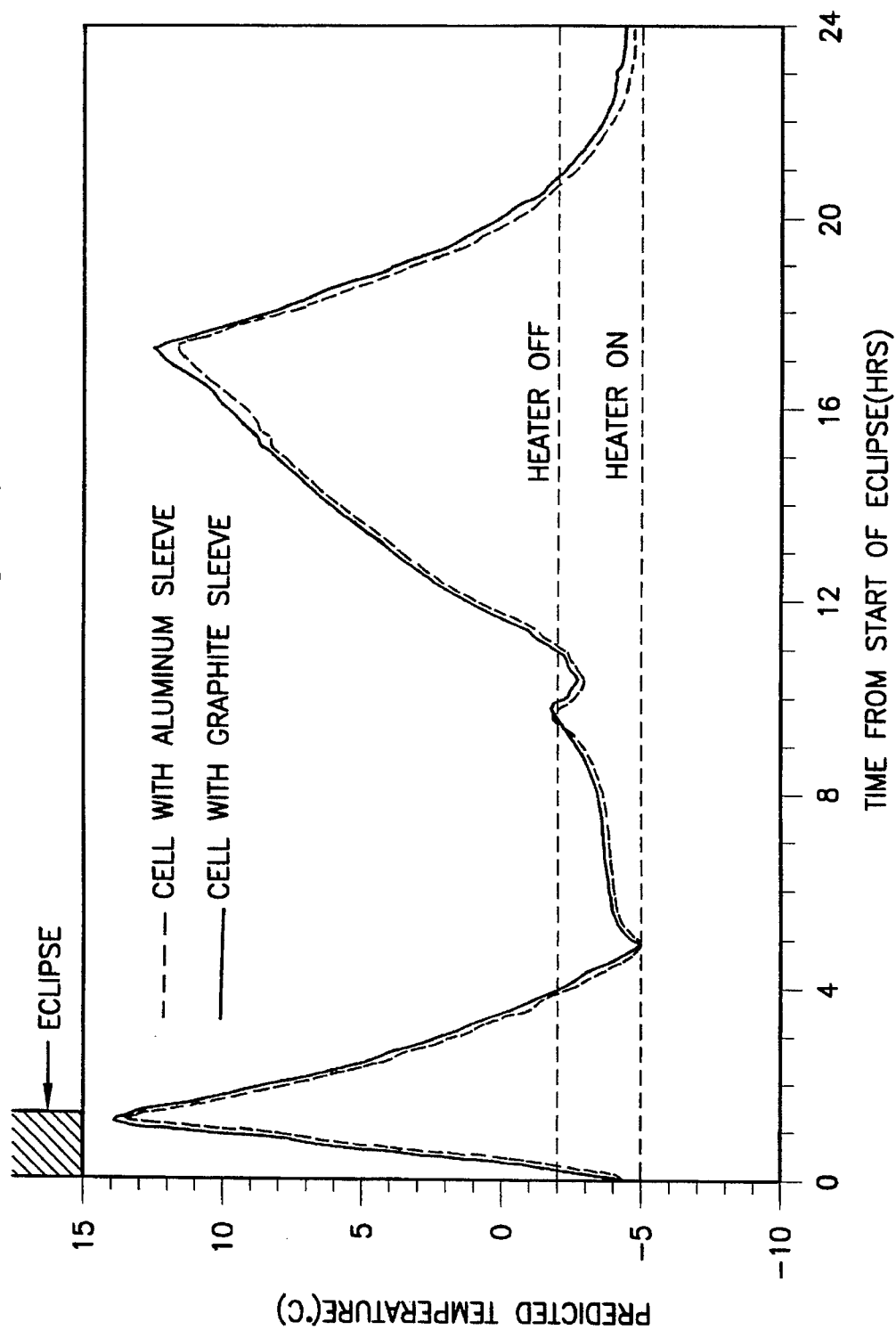
FIG. 4 is a graph comparing the performance of the graphite/epoxy construction of the battery cell sleeve assembly of the invention with the prior art aluminum construction.

Turn now to the drawings and, initially, to FIG. 1 which diagrammatically illustrates a battery system 20 for use in a spacecraft and embodying the concepts of the present invention. A plurality of battery cell sleeve assemblies 22 are mounted in a manner to be described to a base plate 24 which may be of aluminum honeycomb, for example. The base plate 24 serves as a gross heat shunt for drawing heat away from each of the sleeve assemblies 22. In turn, heat is withdrawn from the base plate 24 and delivered to a suitable optical space radiator 26 via a suitable heat transfer member 28, also diagrammatically shown. The optical space radiator is positioned on the side opposite the honeycombe panel of the base plate and faces space, that is, a low temperature sink.

The design features of the battery cell sleeve assemblies 22 which embody the invention are more clearly demonstrated in FIGS. 2 and 3. FIG. 2 depicts a typical graphite/epoxy sleeve assembly 22 intended for an 85.5 Ah 3.5" diameter battery cell. It serves to replace an aluminum (prior art) sleeve intended for the same cell. The graphite/epoxy sleeve assembly of the invention weighs 185 g whereas the aluminum prior art sleeve assembly weighs 325 g. As shown in FIG. 4, the two sleeve assemblies demonstrate equivalent thermal performance.

Figure 5:
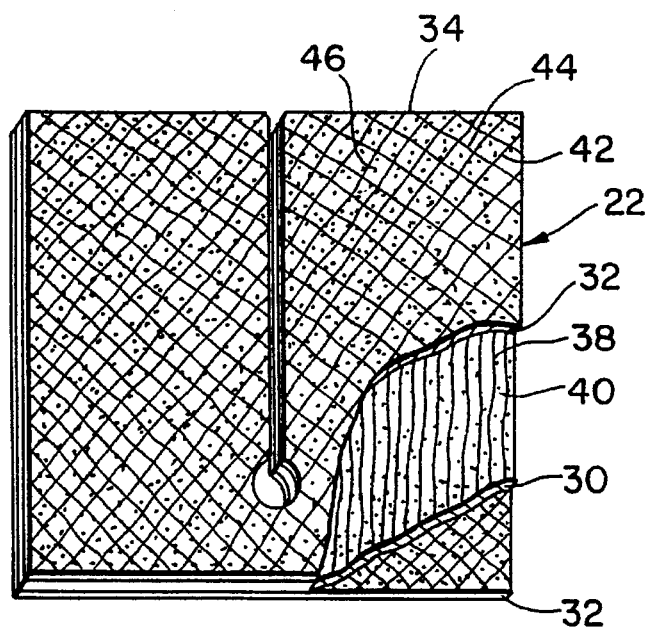
FIG. 5 is a perspective view of the layered construction of the battery cell sleeve assembly of the invention illustrated in a planar configuration and certain parts being cut away for clarity.

The actual construction of the sleeve assembly 22 will now be described with particular reference to FIGS. 3 and 5. FIG. 3 presents an enlargement of an end region of the sleeve assembly and FIG. 5 illustrates the laminated construction of the sleeve assembly in a planar configuration prior to assuming the cylindrical configuration. For purposes of explanation, FIGS. 3 and 5 illustrate the sleeve assembly 22 as including a single thermal sleeve 30 sandwiched between a pair of structural sleeves 32. While this is a preferred construction, the invention need not be so limited. While a sleeve assembly 22 must comprise sandwich constructions of at least one thermal sleeve and at least one structural sleeve, the actual number of sleeves is a design consideration which is within the general scope of the invention.

With continuing reference to FIG. 5, the thermal sleeve 30 extends between proximal and distal ends 34, 36 of the sleeve assembly 22 and has a plurality of first substantially unidirectional longitudinally extending elongated fibers 38 of high conductivity, low density, material embedded in an epoxy matrix 40. Aluminum is the desirable yardstick for the physical characteristics of the sleeve assembly. That is, the fibers 38 are chosen such that the sleeve assembly 22 will have a thermal conductivity substantially greater than aluminum and a density substantially less than aluminum. The fibers are preferably graphite, a commercially available example of the fibers being AMOCO brand K1100 with the graphite fibers oriented either at 0° or at ±15° with respect to the longitudinal axis of the cell. Such layers are typically 0.005" thick and composed of 60% fiber and 40% epoxy by volume. The required thermal conductivity may be obtained by using sufficient layers factored for their off axis angle.

The structural sleeve 32 likewise extends between the proximal and distal ends 34, 36 and is coaxial, coterminous, and proximate the thermal sleeve 30. The structural sleeve 32 is comprised of a plurality of second and third elongated fibers 42, 44 embedded in an epoxy matrix 46. The second and third fibers are substantially unidirectional, respectively, and extend transverse of the first fibers 38. Additionally, the second and third fibers extend in mutually transverse directions.

Figure 6:
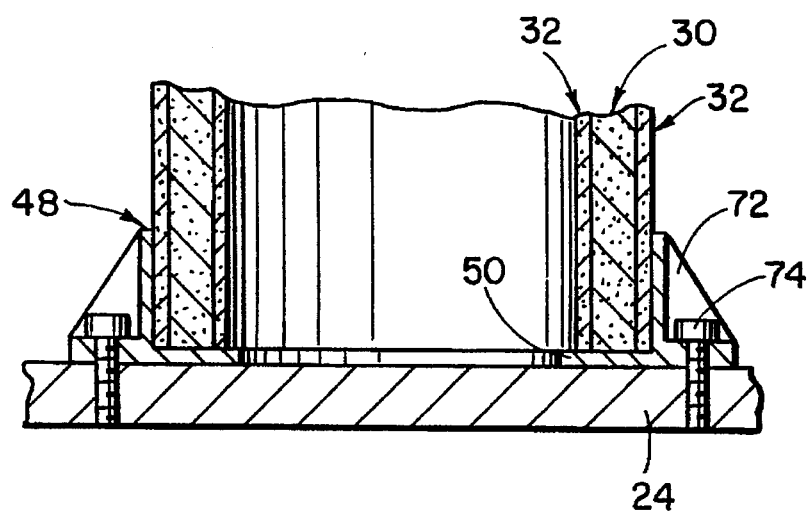
FIG. 6 is a detail cross section view taken generally along line 6—6 in FIG. 1.

Turning now to FIG. 6, a cylindrical base member 48, still likely of aluminum, has an annular flange 50 for reception thereon of distal ends of both the thermal sleeve 30 and of the structural sleeves 32. A suitable adhesive is employed to bond the outer structural sleeve to the inner surface of the upstanding cylindrical part of the base member. The distal ends of the first fibers 38 are contiguous with the annular flange 50 such that the annular flange operates as a heat shunt for drawing heat away from the thermal sleeve by conduction between the fibers 38 and the annular flange.

Considered as a unit, and viewing especially FIG. 2, the sleeve assembly 22 defines a cylindrical shaped recess 52 for reception therein of a battery cell 54. Further, the sleeve assembly has a longitudinally extending slot 56 defined by opposed edges 58, 60 extending from the proximal end 34 to a terminal enlarged stress relief aperture 62 spaced from the distal end 36. The slot 56 and the terminal enlarged stress relief aperture 62 of the thermal sleeve 30 is coextensive with the associated slots and terminal enlarged stress relief apertures of the structural sleeves.

A plurality of clamping devices 64 are provided on the sleeve assembly 22 at a plurality of spaced locations along the longitudinally extending slot 56 for drawing the opposed edges 58, 60 together and thereby firmly securing the battery cell 54 in the recess 52. Each clamping device 64 includes a foot 66 to be suitably bonded to the outer peripheral surface of the sleeve assembly and an upstanding ear 68. One upstanding ear of a pair of clamping devices may have a smooth bore therethrough while its mating ear may be tapped such that a machine screw 70 can be employed to selectively move the edges 58, 60 either toward or away from one another.

Turning again to FIG. 1, a plurality of mounting feet 72 are integrally provided on the base member 48 at a plurality of equally spaced circumferential locations. The mounting feet 72 may be suitably pierced to receive threaded fasteners 74 to mount them securely on the base plate 24. To further secure the battery system 20, additional metal hardware mounts 76 are provided at a plurality of equally spaced circumferential locations and intermediate the ends 34, 36. Crossties 78 extend between the hardware mounts 76 of adjacent sleeve assemblies 22 and are suitably fastened. A rigid structure thereby results which is adequately protective of the battery cells 54 during launch of the spacecraft and under all other conditions to which the battery system 20 is subjected.

The graphite/epoxy/aluminum base sleeve assembly 22 has the further advantage over the prior art all-aluminum sleeves in that it is intrinsically double insulated since the aluminum is hard anodized and the surface of the thermal and structural sleeves 30, 32 is pure epoxy. This affords additional electrical fault protection.

While a preferred embodiment of the invention has been disclosed in detail, it should be understood by those skilled in the art that various other modifications may be made to the illustrated embodiments without departing from the scope of the invention as described in the specification and defined in the appended claims.

We claim:

1. A battery cell sleeve assembly comprising:
   a first cylindrical sleeve extending between proximal and distal ends and having a longitudinal axis comprised of a plurality of substantially unidirectional longitudinally extending first elongated fibers being embedded in an epoxy matrix; a second cylindrical sleeve extending between proximal and distal ends and being coaxial, coterminous, and proximate said first cylindrical sleeve, said second cylindrical sleeve being comprised of a plurality of second and third elongated fibers being embedded in an epoxy matrix, said second and third fibers being substantially unidirectional extending transverse of said first fibers, said second and third fibers extending in mutually transverse directions; and
   a cylindrical base member having an annular flange for reception thereon of said distal ends of said first and second cylindrical sleeves, said distal ends of said first fibers being contiguous with said annular flange whereby said annular flange operates as a heat shunt for drawing heat away from said first cylindrical sleeve by conduction between said first fibers and said annular flange.

2. A battery cell sleeve assembly as set forth in claim 1 wherein at least said first fibers have a thermal conductivity no less than that of aluminum.

3. A battery cell sleeve assembly as set forth in claim 1 wherein said first, second, and third fibers are graphite; wherein said second and third fibers are mutually woven; and wherein each of said first and second sleeves is about 0.005 inches thick and composed of about 60% fiber and 40% epoxy by volume.

4. A battery cell sleeve assembly as set forth in claim 1 wherein said first sleeve is an outer sleeve;
wherein said second sleeve is an inner sleeve defining a recess for reception of a battery therein;
wherein each of said first and second sleeves has a longitudinally extending slot therein defined by opposed edges extending from said proximal end to a terminal stress relief aperture spaced from said distal end, the slot and terminal stress relief aperture of said first sleeve being coextensive with the slot and terminal stress relief aperture of said second sleeve; and including:
   clamping means on said first sleeve at a plurality of spaced locations along the longitudinally extending slot for drawing said opposed edges together and thereby firmly securing the battery in the recess.

5. A battery cell sleeve assembly as set forth in claim 1 wherein said first sleeve is an outer sleeve;
wherein said second sleeve is an inner sleeve defining a recess for reception of a battery therein;
wherein each of said first and second sleeves has a longitudinally extending slot therein defined by opposed edges extending from said proximal end to a terminal stress relief aperture spaced from said distal end, the slot and terminal stress relief aperture of said first sleeve being coextensive with the slot and terminal stress relief aperture of said second sleeve; and including:
   clamping means on said first sleeve on opposite sides of the longitudinally extending slot for drawing said opposed edges together and thereby firmly securing the battery in the recess.

6. A battery cell sleeve assembly as set forth in claim 1 including bonding means for fixedly joining said first and second sleeves to said base member.

7. A battery cell sleeve assembly as set forth in claim 1 wherein said first and second sleeves are bonded together at their interface.

8. A battery cell sleeve assembly as set forth in claim 1 wherein said first and second fibers have a thermal conductivity no less than that of aluminum.

9. A battery cell sleeve assembly comprising:
   a first cylindrical sleeve extending between proximal and distal ends and having a longitudinal axis comprised of a plurality of substantially unidirectional longitudinally extending first elongated fibers of high conductivity, low density, material, said first fibers being embedded in an epoxy matrix;
   a pair of second cylindrical sleeves extending between proximal and distal ends and being coaxial, coterminous, and in a sandwiched relationship with said first cylindrical sleeve, each of said second cylindrical sleeves being comprised of a plurality of second and third elongated fibers of high conductivity, low density, material, being embedded in an epoxy matrix, said second and third fibers being substantially unidirectional extending transverse of said first fibers, said second and third fibers extending in mutually transverse directions; and
   a cylindrical base member having an annular flange for reception thereon of said distal ends of said first and second cylindrical sleeves, said distal ends of said first fibers being contiguous with said annular flange whereby said annular flange operates as a heat shunt for drawing heat away from said sleeve assembly by conduction between said first fibers and said annular flange.

10. A battery cell sleeve assembly comprising:

first and second cylindrical integral superimposed layers, said first layer extending between proximal and distal ends and having a longitudinal axis and comprised of a plurality of substantially unidirectional longitudinally extending first elongated fibers being embedded in an epoxy matrix, said second layer extending between proximal and distal ends and being coaxial, coterminous, and proximate said first layer, said second layer being comprised of a plurality of second and third elongated fibers being embedded in an epoxy matrix, said second and third fibers being substantially unidirectional extending transverse of said first fibers, said second and third fibers extending in mutually transverse directions; and a cylindrical base member having an annular flange for reception thereon of said distal ends of said first and second layers, said distal ends of said first fibers being contiguous with said annular flange whereby said annular flange operates as a heat shunt for drawing heat away from said first cylindrical sleeve by conduction between said first fibers and said annular flange.

* * * * *